United States Patent [19]
Pirkle

[11] Patent Number: 5,816,493
[45] Date of Patent: Oct. 6, 1998

[54] THERMALLY EXPANSIBLE COMPOSITIONS METHODS FOR PREPARATION AND DEVICES USING SAME

[75] Inventor: Fred L. Pirkle, Abington, Pa.

[73] Assignee: Texan Corporation, Horsham, Pa.

[21] Appl. No.: 631,292

[22] Filed: Apr. 8, 1996

[51] Int. Cl.⁶ .................................................. G05D 23/02
[52] U.S. Cl. ................... 236/101 R; 337/394; 524/588; 524/858; 524/860; 524/861
[58] Field of Search ..................... 524/588, 858, 524/860, 1, 869; 424/473; 60/527, 528, 530, 531; 374/187; 236/99 R, 99 K, 121 R, 101 R, 103; 106/270, 271, 272; 337/382, 393–397

[56] References Cited

U.S. PATENT DOCUMENTS

| | | | |
|---|---|---|---|
| 2,120,006 | 6/1938 | Strain | 18/55 |
| 2,670,323 | 2/1954 | Hunter et al. | 196/149 |
| 2,743,365 | 2/1956 | Ferris et al. | 67/22 |
| 2,967,817 | 1/1961 | Marple et al. | 208/21 |
| 3,046,101 | 7/1962 | Tench | 44/7.5 |
| 3,599,865 | 8/1971 | Kristiansen | 236/99 |
| 3,680,022 | 7/1972 | Bright | 337/315 |
| 3,802,510 | 4/1974 | Johnson | 169/19 |
| 4,002,706 | 1/1977 | Pretorius | 264/13 |
| 4,025,041 | 5/1977 | Tyler | 236/90 |
| 4,100,092 | 7/1978 | Spauschus | 252/70 |
| 4,155,504 | 5/1979 | Caldwell | 236/49 |
| 4,176,786 | 12/1979 | Braukmann | 236/99 K |
| 4,203,545 | 5/1980 | Fackler | 236/93 A |
| 4,253,304 | 3/1981 | Lamb et al. | 60/527 |
| 4,507,921 | 4/1985 | Hammarstedt | 60/527 |
| 4,513,881 | 4/1985 | Heimovics, Jr. | 222/54 |
| 4,541,735 | 9/1985 | Abu-Isa | 374/188 |
| 4,844,984 | 7/1989 | Eckenhoff et al. | 424/438 |
| 5,033,865 | 7/1991 | Kuze | 374/160 |
| 5,045,266 | 9/1991 | Moro et al. | 264/222 |
| 5,213,809 | 5/1993 | Wright et al. | 424/473 |
| 5,215,753 | 6/1993 | Wright et al. | 424/473 |
| 5,229,133 | 7/1993 | Wright et al. | 424/473 |
| 5,275,334 | 1/1994 | Yumoto | 236/58 |
| 5,546,757 | 8/1996 | Whipple, III | 62/225 |

OTHER PUBLICATIONS

M. Broadhurst, "An Analysis of the Solid Phase Behavior of the Normal Paraffins", *Journal of Research of the National Bureau of Standards*, 66A (3) :241–249 (May–Jun, 1962).

*Primary Examiner*—Jeffrey T. Smith
*Assistant Examiner*—D. Aylward
*Attorney, Agent, or Firm*—Howson and Howson

[57] ABSTRACT

A thermally expansible composition is provided as well as method of making the composition and actuators and other devices employing the composition. The composition comprises a mixture of silicone elastomer and a thermostatic wax, polymer, alloy or alloy mixture that melts below 400° F. The composition is moldable by any common technique, may be handled at room temperature without heating or refrigeration and can be easily contained in an actuating device without seals other than an anti-extrusion closure seal. This composition can be used in actuators without seals or return springs or other reconsolidating means.

9 Claims, 2 Drawing Sheets

THERMALLY EXPANSIBLE COMPOSITIONS METHODS FOR PREPARATION AND DEVICES USING SAME

FIELD OF THE INVENTION

The present invention relates to the field of thermal materials, and their many uses, such as in thermostats, actuators and valves. In particular, the invention relates to compositions containing silicone rubber and at least one of a group of thermally expansive material including a wax, a polymer, and a low-melting alloy.

BACKGROUND OF THE INVENTION

Materials which change shape or phase in response to temperature changes have long been used in thermoactuating devices. These devices operate by relying upon the mechanical force produced by the thermal expansion of fluids or the expansion which takes place when a material changes from the solid phase to the liquid phase as a result of a temperature change. For example, since at least the early 1900's, paraffin wax has been used as a thermal actuator in mechanical devices. Paraffin wax materials have been frequently used in automobile actuators or thermostats [See, e.g., U.S. Pat. No. 5,033,865]. However, due to the nature of paraffin wax itself, such actuators were characterized by sealing problems or leakage of the wax from its container.

Later actuator compositions employed polyisobutylene (PIB), which absorbs paraffin wax to become a gel. Into this mixture copper flake was suspended for heat conduction. Essentially the PIB and copper were formed into a pellet or simple shapes, e.g. a cylinder, useful as actuators. However, the PIB and wax mixture also is characterized by leakage problems in use. PIB and wax have a molasses-like consistency at room temperature and, when heated, form a liquid. Additionally, PIB, wax, and copper mixtures have the ability to expand only about 5–10% by volume. Thus, this actuator composition is difficult to handle and has limited use in actuators. It has also been observed that increasing the PIB and decreasing the wax to obtain better material consistency produces a chewing gum-like material.

Thus, problems commonly associated with mechanical devices having thermal actuators include difficulty in sealing the device so that the thermostatic material does not leak out of the device while it is in the liquid phase. Currently available thermally responsive materials are also difficult to form in complex shapes and in large production quantities. These problems with presently available thermal-actuating materials also impose product design limitations. Relatively large springs are required to act against mechanical actuator components to create large hydraulic forces to reconsolidate the thermo-actuated materials during cooling to their solid phase.

Until the present invention was developed, there was a need in the art for new thermostatic compositions which can replace, and resolve the problems associated with, presently available thermoactuating materials.

SUMMARY OF THE INVENTION

In one aspect, the invention provides a thermally expansible material which is composed of between about 25% to about 90% by weight of a silicone rubber or elastomer admixed with between about 75% to about 10% by weight of one component, or a mixture of components, selected from the group consisting of a wax, a polymer capable of a phase change or expansion at a desired temperature and an alloy or alloy mixture that melts at below 400° F. A further minor component of the material is a cure agent. The components may be in the form of particulates which are dispersed throughout the silicone rubber.

In another aspect, the invention provides a method for preparing a thermally expansible material.

In still a further aspect, the invention provides a thermally-responsive actuator comprising a thermally-expansible material described above. In one embodiment, the thermal actuator comprises a body having an interior space substantially filled with the thermally-responsive expansible composition, a passage, and a piston extending through the passage and extensible in response to expansion of the composition, wherein the composition is as described above.

Other aspects and advantages of the present invention are described further in the following detailed description of the preferred embodiments thereof.

DETAILED DESCRIPTION OF THE INVENTION

Figure 1:
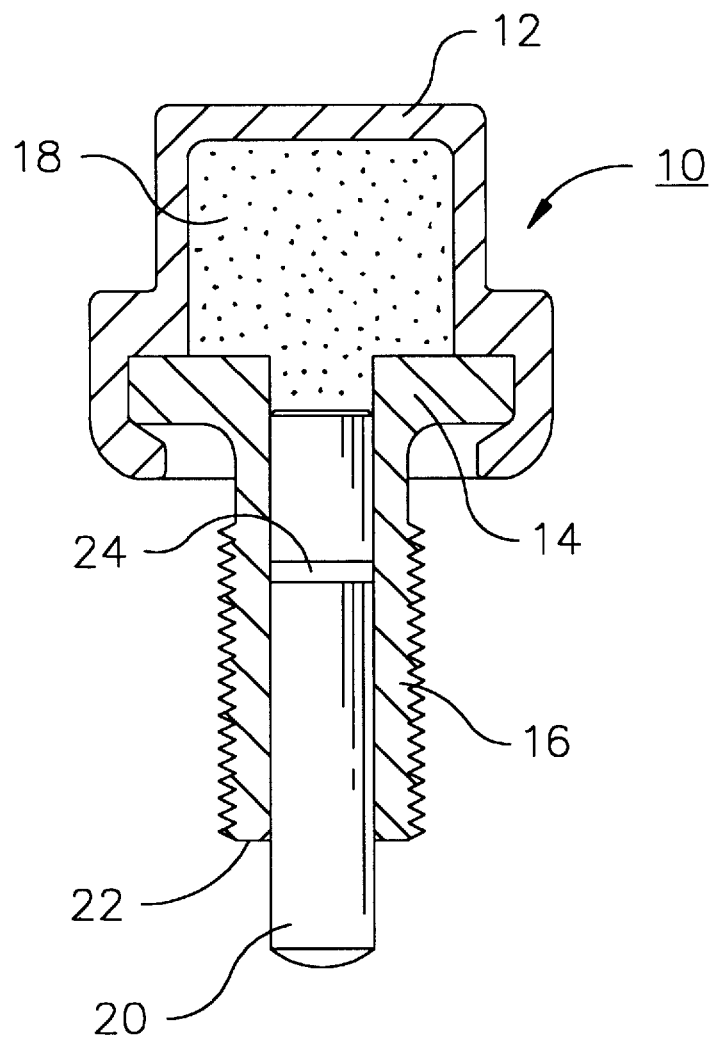
FIG. 1 is an axial section of a thermal actuator utilizing a thermally responsive, expansible composition in accordance with the invention.

The present invention provides a novel composition which is thermally expansible over a broad range of temperatures and has advantages in use over conventional compositions capable of expansion and contraction in response to temperature changes. The invention also provides a novel and improved apparatus which employ the thermally expansible material of this invention.

A. The Thermally Expansible Material

According to the invention, a desirable thermally expansible materials comprises at least 25% to about 90% by weight of a silicone elastomer (cured after admixture) and from about 75% to about 10% by weight of one or a combination of the following components: a wax, a polymer or a low-melting point alloy. The components may be in the form of particulates which are dispersed throughout the silicone rubber. This composition is a stable solid below its melting point, which is preferably in the range of 100° F. to 500° F. A particularly desirable embodiment of this material contains 64% by weight silicone elastomer, 30% by weight wax, and 6% by weight of a cure agent.

1. The Silicone Component

Preferably the silicone elastomer is a room temperature vulcanization (RTV) silicone elastomer, also commonly referred to as an RTV silicone rubber. (RTV) silicone elastomers are supplied as uncured rubbers that have liquid or pastelike consistencies. They are based on polymers of intermediate molecular weights and therefore viscosities, eg, 100–1,000,000 mm$^2$/s (=cSt) at 25° C. Curing is based on chemical reactions that increase polymer molecular weights and provide cross-linking. Catalysts (i.e., cure agents) are used for curing. Two types of RTV-silicone rubbers are commercially available. The cure reactions of one-component products generally are triggered by exposure to atmospheric moisture. Those of two-component products are triggered by mixing the two components, one of which consists of or contains the catalyst or cure agent. The two components are supplied separately.

One-component RTV rubbers are made by mixing polymers, fillers, additives, curing agents, and catalysts and packaging the mixture to protect it from moisture. Contact with moisture in air brings about reactions which cure the polymer. The time required for cure depends upon the curing system, the temperature, the humidity, and the thickness of the silicone layer. Under typical ambient conditions, the surface can be tack-free in 15–30 min and a 0.3-cm thick layer cures in less than a day. Cure progresses and strength is developed slowly for about three weeks.

The original viscosity of these RTV materials depends principally on that of the polymer components and the filler loading. Input polymer properties and cross-link density both affect the ultimate strength of the fully cured elastomer as do the identity and loading of fillers. The polymers used in nearly all commercial products are exclusively polydimethylsiloxanes. Polymers with substituents other than methyl can be used to modify and improve certain properties, e.g., trifluoropropyl groups lead to better solvent resistance. Some products are compounded to be pourable, others to be thixotropic. These characteristics are controlled by fillers and additives. Silica-filled polydimethylsiloxane systems, lacking pigments and other additives, cure to form translucent rubbers. Since the specific gravity of silicas (ca 2.2) exceeds that of siloxanes (ca 1.0), the RTV specific gravity depends on the filler loading. See, e.g., B. B. Hardman et al, "Silicon Compounds (Silicones)" pp.922–962 in Kirk-Othmer, Encyclopedia of Chemical Technology, 3rd edit., vol. 20, John Wiley & Sons, New York (1982), incorporated by reference herein.

An exemplary silicone elastomer product useful in the present invention is the commercially available product, SILASTIC J RTV silicone rubber (Dow Corning Corporation, Midland, Mich). This silicone rubber is cured under heat by interaction with 10% by weight of a curing agent or catalyst, such as SILASTIC J curing agent [Dow Corning] according to manufacturer's instructions. Preferably the silicone rubber is curable from about room temperature to about 150° F.

Other silicone rubbers, including heat-cured silicones and other RTV silicone rubbers may be employed in place of the above-described silicone. Such silicone rubbers, curing agents, catalysts and kits containing same, as well as methods for curing the silicone elastomers are publicly and commercially available and may be purchased from other manufacturers.

Silicone rubber imparts desirable properties to the thermally expansible material of this invention, in that it has good heat conduction properties, is stable at high temperatures, and is both moldable and curable.

2. The Wax Component

In one embodiment of the thermally expansible material, the silicone elastomer is mixed with between about 75% to about 10% by weight of the total composition of a saturated hydrocarbon wax. Preferably, the wax is present in an amount of between about 10 to about 50% by weight.

The effect of a hydrocarbon on the silicone rubber is to "plump"(or increase the volume of) the material. In a melted state, when the material plumps, it seals. Where the thermally expansible material is desired to change phase at about 250° F. or below, useful waxes are stable, microcrystalline or liquid normal aliphatic hydrocarbon (paraffin) waxes, generally characterized by carbon chains of at least 6 to about 45 carbons, sharp melting points, and relatively large volume change at melting point. The wax preferably has a coefficient of thermal expansion of at least 5% and up to about 30%. Such waxes include, without limitation, n-tridecane, n-pentadecane, n-tricosane, n-tetracosane, n-pentacosane, m-hexacosane, n-octacosane, n-triacontane, n-hexatriacontane, n-tetratetracontane and the like. These waxes are commercially available (e.g., Astor, Titusville, Pa.; Humphrey Chemical Co., North Haven, Conn., or Scheel Corp., Brooklyn, N.Y.).. See, also, M. G. Broadhurst, J. Research of the Natl. Bur. of Stds., 66A(3): 241–249 (May,1962), incorporated herein by reference.

3. The Polymer Component

Where the thermally expansible material is desired to change phase at above 250° F., the silicone elastomer is mixed with between about 75% to about 10% by weight of a polymer. This component is characterized by the ability to change phase from solid to liquid within a narrow temperature range. While polymers that exhibit a linear phase change can be used in this invention, it is presently preferred to use polymers that undergo a large volume expansion at or around the phase change temperature. A desirable polymer for such use is polyurethane, acetyl plastic, polyethylene and UHMW plastic. Such polymers are commercially available from a number of chemical companies [Rohm and Haas, General Electric, Allied Chemical, Monsanto, Dow, Union Carbide, etc.].

4. The Alloy Component

Other embodiments of the invention employ a thermally expansible material containing at least 25% to about 90% by weight of the silicone elastomer admixed with between 75 to about 10% by weight of an alloy or alloy mixture that melts at below 400° F., and preferably between 100–400° F. Among such alloys are those sold under the trademark INDALLOY™, for example, INDALLOY™ No. 1E, which contains 52 In, 48 Sn and INDALLOY™ No. 51, which contains 62.5 Ga, 21.5 In, 16 Sn, and other alloys which are eutectic and/or melt over a very narrow temperature band (i.e., over a band of 1° F. or less). Other alloys may also be employed. Such alloys are commercially available from Indium Corp., Utica, N.Y. and Arconium Specialty Alloys, Providence, R.I., among others.

Various embodiments of the thermally expansible material of this invention employ mixtures of the various components of the invention. For example, one embodiment can contain 70% by weight of the J RTV silicone rubber, and 30% by weight of a hydrocarbon wax, e.g., n-tridecane. Still another material may contain 75% by weight of the J RTV silicone rubber, and 25% by weight of a polymer, such as polyurethane. Another material of the invention may contain 75% by weight of the J RTV silicone rubber, and 25% by weight of a low-melting point alloy. Depending on the temperature at which the mixture must change phase (which in turn depends on its intended use), one of skill in the art may readily combine various components of this mixture to obtain the desired thermally expansible material. This is a desirable characteristic of such materials because different end use devices, e.g., actuators, require the material to change phase at a variety of temperatures.

5. Methods of Making the Material

The thermally expansible material of the present invention may be readily prepared, once the components are selected for their desired characteristics.

One method comprises the following steps.

a. A thermostatic mixture is prepared from components selected from the group consisting of a hydrocarbon wax, a polymer and an alloy or mixtures of them by liquefying in a blender solid wax pieces, with the optional polymer and/or alloy and dry ice until a fine powder consistency is acheived. Typically, the blender is run at a typical liquefying speed for between 1–2 minutes; however, this time and blender speed may be adjusted by one of skill in the art to compensate for varying amounts of the components in the mixture. The resulting powder is then filtered through at least one, and preferably more than one, mesh filters to obtain only very fine powdery particles. In one embodiment, three different pore size mesh filters are employed, i.e., a #25 mesh filter with pores of 0.0278 inches; a #35 mesh filter with pores of 0.0197 inches; and a #50 mesh filter with pores size of 0.0117 inches, consecutively.

b. Between 25% to 90% by weight of a selected silicone elastomer with a desired amount of a cure agent (i.e., a catalyst) are mixed against at liquefying speed in a blender with between 75% to 10% by weight of the fine powder of (a) until a flowable mixture is formed.

c. The mixture of (b) is poured into a mold having a desired shape.

d. A vacuum is created in said mold by removal of air therefrom.

e. The admixture is cured in the shape of said mold by heating for between 15–45 minutes at a temperature of about 150° F., in a conventional heating apparatus, such as a microwave or oven.

In another embodiment of a method according to this invention, the process steps are as follows:

f. Between 25–90% by weight of a silicone rubber and curing agent are admixed and allowed to cure according to manufacturer's instructions.

g. This cured silicone is then ground to a fine powder in a conventional blender which is run under liquefying speeds for about 1–2 minutes.

h. The product of (g) is mixed with a finely powdered thermostatic mixture in paragraph (a) defined above in the preceding method.

i. The mixture of (h) is then blended with additional silicone rubber and curing agent until a flowable mixture is formed.

j. The flowable mixture is then poured into a mold from which the air is removed and cured as described in paragraph (e) to its desired form.

The resulting molded material prepared by either method has a distinct shape at room temperature but is flexible or spongy to the touch. The thermally expansible material expands, or otherwise changes phase, upon exposure to a readily determinable phase change temperature. The rate of expansion of the material and the phase change temperature depends upon the particular composition (i.e., how much Si, how much wax, etc.), and can be determined readily by one of skill in the art. The material returns to its original shape upon cooling, according to a typical hysteresis curve.

The thermally expansible materials of the present invention have a number of advantageous characteristics in contrast to otherwise available thermally responsive materials. When you mix the components of the thermally expansible materials of this invention, a composition results which is easy to handle, mold and shape. The materials of this invention can easily be formed into a finished shape by any common technique, such as casting or molding via compression transfer injection, extrusion or liquid injection. These materials can also be handled at room temperature without heating or refrigerating equipment. These compositions can also be easily contained in an actuating device without seals other than an anti-extrusion closure seal, and alternatively, can be used without seals or return springs to form a valve element. Even more advantageously, the thermally expansible materials of this invention require no reconsolidating means in the end-use device, e.g., an actuator containing the material, because the material has a memory. Upon cooling from its heated phase change, the thermally expansible material of this invention returns to its low end temperature state.

B. Apparatus Employing the Material

As shown in the drawing, an actuator 10 comprises a metal actuator body 12, into which is crimped the flange 14 of a threaded sleeve 16. The actuator body and flange 14 form an enclosure containing the thermally responsive expansible material 18. A piston 20 is slidable in sleeve 16, and extends outwardly from the end 22 of the sleeve. A ring 24 on the piston engages the interior of the sleeve frictionally to prevent the piston from falling out of the sleeve.

In the operation of the actuator, with the thermally expansible material initially at a temperature below its melting point, the piston 20 is in a fully retracted condition. When the temperature of the thermally responsive material rises to a level above the melting point, the material 18 expands, forcing the piston outwardly so that it can perform useful work, for example operate a valve.

A typical actuator requires a diaphragm or other seal to prevent leakage of the thermal material, e.g. wax with or without PIB, which becomes fluid at elevated temperatures. However this new actuator, because it utilizes silicone rubber as a component of the thermally responsive material 18, does not require a diaphragm or seal. The silicone elastomer-containing material does not leak past the piston.

Figure 2:
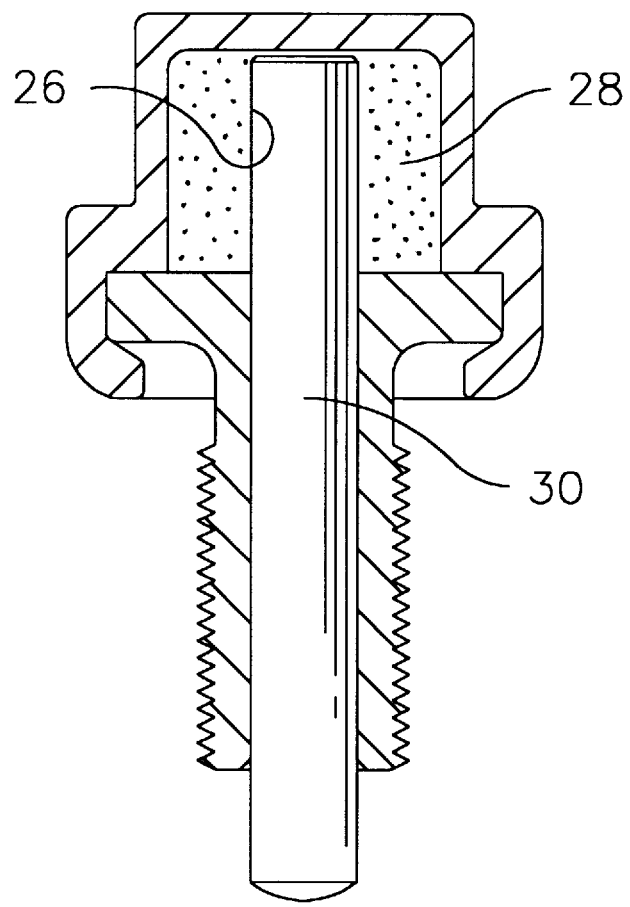
FIG. 2 is a similar axial section, showing a modified actuator in accordance with the invention.

In the actuator of FIG. 2, a hole 26 is drilled into the thermally responsive material 28 while in its solid condition. The diameter of the hole is made slightly less than the diameter of the piston 30, and the piston, which is longer than piston 20 of FIG. 1, extends through the sleeve and into the hole in the thermally responsive material. The thermally responsive material grips the piston, preventing it from falling out of the sleeve, thereby obviating the friction ring 24 (FIG. 1). Otherwise, the actuator of FIG. 2 is structurally similar to the actuator of FIG. 1, and operates in a similar manner.

Example 1

Preparation of an Embodiment of a Thermally Expansible Material of this Invention.

A thermally expansible material of the present invention is prepared as follows:

30% by weight n-tridecane wax and dry ice are blended in a conventional blender under liquefying speed for about 1–2 minutes until a fine powder consistency is acheived. The resulting powder is then filtered through three mesh filters to obtain only very fine powdery particles. The three different pore size mesh filters are, consecutively, a #25 mesh filter with pores of 0.0278 inches; a #35 mesh filter with pores of 0.0197 inches; and a #50 mesh filter with pores size of 0.0117 inches.

JRTV Silicone Rubber [Dow Corning] is prepared with its catalyst RTV curing agent according to manufacturer's instructions. The uncured silicone rubber (64% by weight) is mixed with the 30% by weight n-tridecane wax powder by a conventional mixer at liquefying speed until a flowable mixture is formed.

In its liquid state, the thermally expansible material is poured into a selected mold, e.g., a valve shape of desired length and width. A vacuum is created in said mold by removal of air therefrom. This admixture, with 6% by weight of the curing agent provided by the silicone rubber manufacturer, is cured in the shape of said mold by heating for between 15 and 45 minutes at a temperature of about 150° F., in a conventional heating apparatus, i.e., a microwave. As it cools, the molded material solidifies into a solid but spongy consistency in the shape of the mold. The resulting molded material has a distinct shape at room temperature but is flexible or spongy to the touch, and expands upon exposure to temperatures above 150° F.

Numerous modifications and variations of the present invention are included in the above-identified specification and are expected to be obvious to one of skill in the art. For example, a variety of selections of the indicated components forming the thermally expansible composition and minor modifications to the method steps involved in making and molding the thermally expansible materials may be made as indicated above. Similarly, the thermally expansible material may be employed in a number of types of apparatus to replace conventional means for actuating devices subject to temperature changes. Such modifications and alterations to the compositions and processes of the present invention are believed to be encompassed in the scope of the claims appended hereto.

What is claimed is:

1. A thermally responsive expansible composition comprising: (a) between about 25% and about 90% of a cured silicone elastomer in a mixture with (b) between about 75% and about 10% by weight of a thermostatic material comprising one or a mixture of components selected from the group consisting of a wax, a polymer and an alloy or alloy mixture that melts below 400° F.

2. The composition according to claim 1 in which said thermostatic material (b) comprises a wax selected from the group consisting of n-tridecane, n-pentadecane, n-tricosane, n-tetracosane, n-pentacosane, m-hexacosane, n-octacosane, n-triacontane, n-hexatriacontane, and n-tetratetracontane.

3. The composition according to claim 1, wherein said thermostatic material comprises a polymer selected from the group consisting of polyurethane, acetyl plastic, polyethylene and ultra high molecular weight plastic.

4. The composition according to claim 1 in which said thermostatic material comprises an alloy selected from the group consisting of a mixture containing 52% by weight In and 48% by weight Sn and a mixture containing 62.5% by weight Ga, 21.5% by weight In, and 16% by weight Sn.

5. The composition according to claim 1 in which said cured silicone elastomer is RTV silicone rubber.

6. The composition according to claim 1 in which the cured silicone elastomer is formed from a silicone elastomer and a curing agent, and in which the composition is formed by admixture of about 64% by weight of silicone elastomer with about 30% by weight of n-tridecane wax and 6% of a curing agent.

7. A thermal actuator comprising a thermally-responsive expansible composition comprising: (a) between about 25% and about 90% by weight of a cured silicone elastomer in a mixture with (b) between about 75% and about 10% by weight of a thermostatic material comprising one or a mixture of components selected from the group consisting of a wax, a polymer and an alloy or alloy mixture that melts below 400° F.

8. A thermal actuator comprising a thermally-responsive expansible composition comprising a cured silicone elastomer and n-tridecane wax, in which the composition is formed by admixture of about 64% by weight of a silicone elastomer with about 30% by weight of n-tridecane wax and 6% of a curing agent.

9. A thermal actuator comprising a body having an interior space substantially filled with a thermally-responsive expansible composition, a passage, and a piston extending through the passage and extensible in response to expansion of said composition, wherein the composition comprises (a) between about 25% and about 90% by weight of a cured silicone elastomer in a mixture with (b) between about 75% and about 10% by weight of a thermostatic material comprising one or a mixture of components selected from the group consisting of a wax, a polymer and an alloy or alloy mixture that melts below 400° F.

* * * * *